(12) United States Patent
Dittmar

(10) Patent No.: US 9,096,022 B2
(45) Date of Patent: Aug. 4, 2015

(54) INJECTION MOULDING PROCESS FOR PRODUCING COMPONENTS

(75) Inventor: Harri Dittmar, Neuheim (CH)

(73) Assignee: Quadrant Plastic Composites AG, Lenzburg (CH)

(*) Notice: Subject to any disclaimer, the term of this patent is extended or adjusted under 35 U.S.C. 154(b) by 605 days.

(21) Appl. No.: 13/390,713

(22) PCT Filed: Aug. 17, 2010

(86) PCT No.: PCT/EP2010/061997
§ 371 (c)(1),
(2), (4) Date: Jun. 1, 2012

(87) PCT Pub. No.: WO2011/020841
PCT Pub. Date: Feb. 24, 2011

(65) Prior Publication Data
US 2012/0244323 A1    Sep. 27, 2012

(30) Foreign Application Priority Data

Aug. 17, 2009  (CH) .................................. 1273/09

(51) Int. Cl.
| | | |
|---|---|---|
| *B29C 45/14* | (2006.01) | |
| *B29C 70/48* | (2006.01) | |
| *B29K 101/12* | (2006.01) | |
| *B29K 709/08* | (2006.01) | |

(52) U.S. Cl.
CPC ............. *B29C 70/48* (2013.01); *B29K 2101/12* (2013.01); *B29K 2709/08* (2013.01); *Y10T 428/24636* (2015.01)

(58) Field of Classification Search
CPC .. B29C 70/48; B29C 70/083; B29K 2101/12; B29K 2709/08
USPC .......................................................... 264/258
See application file for complete search history.

(56) References Cited

U.S. PATENT DOCUMENTS 3,919,446 A * 11/1975 Smarook ....................... 428/116
4,025,686 A *  5/1977 Zion ............................. 442/373
(Continued)

FOREIGN PATENT DOCUMENTS

| CN | 88102537 A | 12/1988 |
|---|---|---|
| DE | 102007037680 A1 | 2/2009 |

(Continued)

OTHER PUBLICATIONS

International Preliminary Report on Patentability in PCT/EP2010/061997, Feb. 21, 2012, 7 pages.*

(Continued)

*Primary Examiner* — Matthew Daniels
(74) *Attorney, Agent, or Firm* — Brooks Kushman P.C.

(57) ABSTRACT

Components are produced by injecting a thermoplastic melt into a mold, wherein a flat blank of two or more fiber woven or non-crimp fiber fabrics connected at one or both sides thereof with a randomly oriented fiber layer and impregnated with a thermoplastic is heated to above the softening temperature of the thermoplastic, the thus expanded porous blank is laid out adjacent to one of the two inner walls of the mold, the mold is closed, compressing the blank, reopened to a desired width, and thermoplastic melt is injected into the porous core. Components with the shape of flat, bent, curved or buckled plates prepared by the process are particularly useful in automotive applications

11 Claims, 2 Drawing Sheets

(56) References Cited

U.S. PATENT DOCUMENTS

| | | | | |
|---|---|---|---|---|
| 4,259,274 A | * | 3/1981 | Tiitola | 264/46.5 |
| 4,445,951 A | * | 5/1984 | Lind et al. | 156/93 |
| 4,758,395 A | * | 7/1988 | Zion | 264/135 |
| 4,770,929 A | * | 9/1988 | Nobumasa et al. | 442/278 |
| 4,906,506 A | * | 3/1990 | Nishimura et al. | 428/113 |
| 4,957,801 A | * | 9/1990 | Maranci et al. | 428/147 |
| 5,023,041 A | * | 6/1991 | Jones et al. | 264/510 |
| 5,085,928 A | * | 2/1992 | Krueger | 428/474.4 |
| 5,173,227 A | * | 12/1992 | Ewen et al. | 264/46.6 |
| 5,230,844 A | * | 7/1993 | Macaire et al. | 264/46.7 |
| 5,308,570 A | * | 5/1994 | Hara et al. | 264/255 |
| 5,344,687 A | * | 9/1994 | Grimnes | 428/102 |
| 5,364,258 A | * | 11/1994 | Buckley et al. | 425/501 |
| 5,733,494 A | | 3/1998 | Moore | |
| 5,905,045 A | * | 5/1999 | Vockel et al. | 442/43 |
| 5,993,719 A | * | 11/1999 | Abe et al. | 264/257 |
| 6,572,808 B1 | * | 6/2003 | Saito et al. | 264/261 |
| 7,132,025 B2 | * | 11/2006 | Dittmar | 156/148 |
| 2003/0077965 A1 | * | 4/2003 | Mack et al. | 442/180 |
| 2004/0177911 A1 | * | 9/2004 | Dittmar | 156/62.2 |
| 2004/0219855 A1 | * | 11/2004 | Tsotsis | 442/364 |
| 2005/0170731 A1 | * | 8/2005 | Droux et al. | 442/381 |
| 2005/0257887 A1 | * | 11/2005 | Tsotsis | 156/308.2 |
| 2006/0244170 A1 | * | 11/2006 | Brentrup et al. | 264/122 |
| 2008/0160272 A1 | | 7/2008 | Brentrup et al. | |
| 2008/0277057 A1 | * | 11/2008 | Montgomery et al. | 156/307.1 |
| 2009/0047854 A1 | * | 2/2009 | Bleeker et al. | 442/286 |
| 2009/0202826 A1 | * | 8/2009 | Sekido et al. | 428/365 |

FOREIGN PATENT DOCUMENTS

| | | |
|---|---|---|
| EP | 0 289 860 A1 | 11/1988 |
| EP | 0378854 A1 | 7/1990 |
| GB | 2229392 A | 9/1990 |
| JP | 1110673 A | 1/1999 |
| JP | 2005319637 A | 11/2005 |
| JP | 2007076081 A | 3/2007 |
| JP | 2008543603 A | 12/2008 |
| WO | 02/085601 A1 | 10/2002 |
| WO | 2009020831 A1 | 2/2009 |

OTHER PUBLICATIONS

International Search Report for PCT/EP2010/061997, English translation attached to original, Both completed by the European Patent Office on Nov. 17, 2010, All together 7 Pages.

Japanese Office Action dated Sep. 2, 2014 and English Translation dated Sep. 2, 2014.

Chinese Office Action dated Oct. 17, 2014 (no English translation available).

* cited by examiner

INJECTION MOULDING PROCESS FOR PRODUCING COMPONENTS

CROSS-REFERENCE TO RELATED APPLICATIONS

This application is the U.S. national phase of PCT Appln. No. PCT/EP2010/061997 filed Aug. 17, 2010, which claims priority to Switzerland application CH 1273/09 filed Aug. 17, 2009.

BACKGROUND OF THE INVENTION

1. Field of the Invention

The invention relates to an injection molding process for producing components, particularly automotive parts, by injecting a thermoplastic melt into a mold, and to components that can be produced by means of this process. The components generally have the shape of a flat, bent, curved or buckled plate, whose edges can be straight or rounded. They can also have reinforcing ribs, apertures and mounting points. It is also possible that two plates are connected to each other by means of webs or struts, thereby forming a front wall and a rear wall.

2. Description of the Related Art

Automotive parts are often produced by means of injection molding of thermoplastics. In many cases it is necessary to strengthen a component in order to increase its rigidity and resistance to crash impact. Therefore, attempts have been made to place into the mold some plastic blanks containing endless fibers. However, it has turned out that the adhesion between the blanks and the injected thermoplastic is insufficient and that it is difficult to fix the blanks to the inner walls of the mold. Therefore, in order to obtain distortion-free components, two blanks have to be inserted into the mold, but this is technically difficult.

EP 0 378 854 A1 describes a process for producing a fiber composite material wherein a single fiber mat is impregnated with a plastic material in a closed mold. Thereafter, the mold halves are moved apart from each other, thereby leading to formation of cavities in the interior of the fiber mat. A molten polymeric material can then be injected into these cavities, albeit in a rather complicated manner.

SUMMARY OF THE INVENTION

Therefore, it was an object of the present invention to solve foregoing problems. These and other objects are achieved according to the invention by means of an injection molding process for producing components based on injecting a thermoplastic melt into a mold, the process comprising the following steps:

A. a flat blank comprising two or more fiber woven or multiaxial fabrics that are connected at one or both sides thereof with a randomly oriented fiber layer and are impregnated with a thermoplastic, is heated up to slightly above the softening temperature of the thermoplastic,
B. the blank is laid out adjacent to one of the two inner walls of the forming mold,
C. the mold is closed whereby the blank is compressed and the boundary regions of the blank adjacent to the two inner walls are compacted and adhere thereto,
D. the mold is again opened to the desired width, thereby re-expanding the core of the blank, and the thermoplastic melt is injected into it,
E. the component formed by means of the steps mentioned above is cooled and removed after opening of the mold.

BRIEF DESCRIPTION OF THE DRAWINGS

One embodiment of the invention is henceforth described as a temporal sequence in more detail by means of the drawings which show, each in a vertical section.

DETAILED DESCRIPTION OF THE PREFERRED EMBODIMENTS

Figure 1:
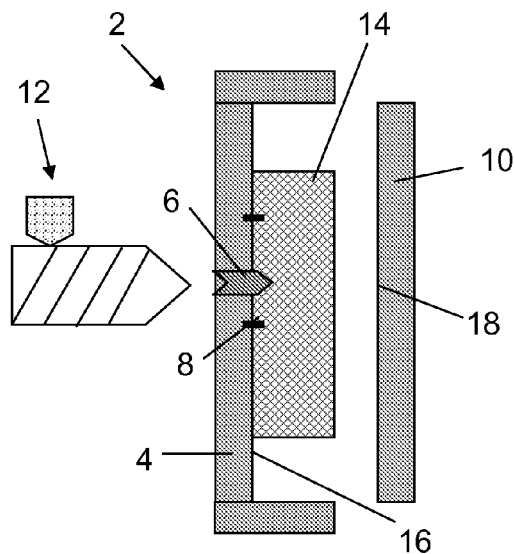
FIG. 1 an open mold, wherein a flat blank is laid out adjacent to its inner wall.

The heating up to above the softening temperature is necessary because the blank experiences slight cooling during transportation from the oven into the mold.

The blanks consist of two or more glass fiber woven or multiaxial fabrics, which are needled with randomly oriented fiber layers. The woven or multiaxial fabrics can be joined at one or both sides thereof to a randomly oriented fiber layer, preferably by needling, or glass fiber rovings can be spread onto and needled to the woven or multiaxial fabrics on one or both sides thereof. It is also possible to use blanks wherein a fiber mat or a glass fiber nonwoven, e.g. with an areal weight of 20 to 200 $g/cm^2$, has been laminated onto the woven or multiaxial fabric. In the latter case the blank is inserted in such manner that the nonwoven layer is oriented outwards. This results in a smooth surface in the finished component. Also, two or more multiaxial fabrics can be arranged at an angle of 90° or 45° on top of each other. Before impregnating with the thermoplast, the woven or multiaxial fabrics connected to the randomly oriented fiber layers preferably have an areal weight of 300 to 2000 $g/m^2$. They are impregnated with a thermoplastic particularly with polypropylene in usual manner, e.g. on a double band press, and thereby compressed. Polyamides, polyesters or high temperature resistant thermoplastics can also be used. Preferred fibers are glass fibers; in addition, also carbon fibers and aramid fibers as well as hybrid fibers made of glass and thermoplastic fibers are useful. The thickness of the blanks can vary between 1.2 and 8 mm, preferably between 1.5 and 5 mm. Particularly preferred blanks contain two or four glass fiber woven or multiaxial fabrics that are needled at both sides thereof with a randomly oriented fiber layer or which are needled at one side thereof with a randomly oriented fiber layer and are preferably laminated at their other side with a thin glass fiber nonwoven. Particularly useful are blanks made of GMTex from the company Quadrant Plastic Composites AG.

The blanks are inserted into the mold in locations where there will be regions of high stress in the final component. They can have substantially the shape of the final component, in which case they are inserted into the mold so as to cover the whole area, or, alternatively, small single pieces or one, two or more stripe shaped blanks with a width of, for example, 5 to 20 cm can be placed on one inner side of the mold depending on where the component is to be reinforced.

As a mold any conventional injection molding or injection stamping mold can be used, which can be shaped in different manners. For example, the two mold halves can be planar; however, depending on the desired shape of the component, it is possible to also use curved or buckled molds. Moreover, regions of the mold that are to be covered with the blanks can be configured as movable units in the mold, whereby the compressing stroke is then conducted by means of movable cores or sliders, in which case it is not necessary to close and partially open again the entire mold. Preferably, horizontally closing molds are used; but in principle it is also possible to use vertically closing injection molding or injection stamping devices, wherein the blanks are placed in the lower mold half and remain in this position due to gravity. Moreover, it is possible to use a conventional press equipped with an injection aggregate.

In the first process step A the blank is heated up to slightly above the softening temperature of the thermoplastic. In the preferred embodiment, the blanks are thereby expanded perpendicularly to the blank plane, for example by about a factor of 1.2 to 5, preferably 1.5 to 4 due to restoring forces of the needled randomly oriented fiber layers. Thereby, air voids and channels are formed in the soft matrix.

In the second process step B the blank is laid out adjacent to one of the two inner walls of the opened tool. The blank should preferably be inserted in such manner that at least one side thereof which is needled with a randomly oriented fiber layer faces away from the mold inner wall. This ensures that the thermoplastic contained in the randomly oriented fiber layer is blended with the thermoplastic melt injected in step D, whereby good adhesion between the blank and the injected thermoplastic is achieved. To improve the fixation of the inserted blank at the inner wall it is advantageous to mount to the inner wall inwardly protruding removable needles, pins or spikes. Further well-established assemblies for fixing flat inserts in injection molding tools can also be used. Subsequently the softened blanks are inserted into the mold by means of standard needle grippers in such manner that they become fixed to the mold inner wall where they are preferably penetrated by the needles, pins or spikes so as to adhere to the inner wall.

In the third process step C the mold is closed and the needles, pins or spikes inserted in step B are retracted again. Due to the pressure applied upon closing the mold, the expanded blank is again compressed, and already after a few seconds the thermoplastic is compacted in the boundary regions of the blanks adjacent to the two cold inner walls, whereby the boundary regions strongly adhere thereto. This adherence is achieved by a certain minimum roughness of the mold surface, which can optionally be determined by conventional preliminary tests.

In the fourth process step D the mold is opened again to the desired width, whereby the randomly oriented fiber layers arranged in the interior of the blank, the plastic matrix of which is still somewhat plastic, are expanded again so that air voids and channels are formed therein. The mold is preferably opened so far that the two halves of the blank adhering to the inner walls of the mold are drawn apart from each other and separated so as to form a gap therebetween. The thermoplastic melt is then injected into this gap in usual manner, and additionally can be distributed in the channels or the air voids.

It is also possible to use an injection stamping process wherein injection is initially made into the widening gap and wherein distribution of the melt is achieved by the subsequent closing stroke of the mold. Thereby the shearing forces acting on the surfaces of the blank are reduced. The injected thermoplastic is preferably the same or of the same kind as that contained in the blank. The thermoplastic can contain conventional additives, for example reinforcing glass fibers, natural fibers, carbon fibers or metal fibers, each having a length of preferably 0.5 to 25 mm, particularly 1 to 5 mm, and/or mineral filler materials, such as e.g. talcum, powdered silica, chalk, but also soot, graphite nanotubes and/or chemical blowing agents, which results in lighter components due to foaming during the melting of the thermoplastic. A physical foaming is also possible.

In the fifth process step E the thermoplastic is allowed to cool, and the finished component having reinforcing fiber woven or multiaxial fabrics at both outer sides thereof is removed.

A further object of the invention is a component with the shape of a flat, bent, curved or buckled ("contoured") plate with an average wall thickness of 3 to 20 mm, comprising a core layer of a thermoplastic containing randomly oriented fiber layers and, at both outer sides thereof, a reinforcing fiber woven or multiaxial fabric, which are each needled with the adjacent randomly oriented fiber layer of the core layer and which contain the same thermoplastic as the core layer. The components of the present invention can also be termed as "planar shapes" although in most cases they are not strictly planar shapes or plates, respectively. In particular, these components can be produced by means of the process of the present invention.

The plates can have a width and a length of 20 to 250 cm, particularly 40 to 100 cm, and a height of 5 to 100 cm, particularly 10 to 50 cm, and they can have a wall thickness of 3 to 20 mm, particularly of 5 to 10 mm. Since the components can also have an irregular shape, the dimensions of width, length and height are maximum values; because of potentially different thicknesses of the parts the dimensions indicated for thickness are average values.

The components produced according to the present invention can be used mainly for automotive applications, e.g. as front ends, side door supports, underfloor linings, battery supports, instrument board supports or for seat shells and backs, but also as bumper supports, pedestrian protection supports and for entire or segmented floor structures. Finally, they can also be used for non-automotive applications, e.g. for large containers.

The mold schematically shown in the figures comprises a left mold half 2 configured as a female cavity with a vertical wall 4 that is provided with an injection opening 6 and with extendable and retractable spikes 8. Furthermore, the mold comprises a right mold half 10 configured as a male tool and an injection device 12 for thermoplastic melt that can be connected to the injection opening 6.

A flat blank 14 configured as described above is initially heated up to or to slightly above the softening temperature of the thermoplastic and then laid out adjacent to the inner wall 16 of the left mold half 2. As shown in FIG. 1 the spikes 8 penetrate into the blank 14 and keep the blank in the desired position.

Figure 2:
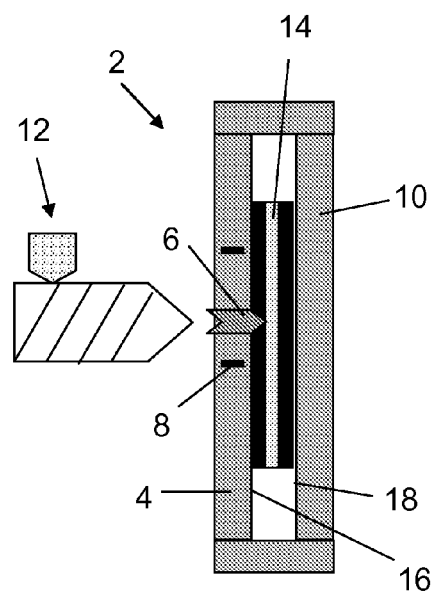
FIG. 2 the mold according to FIG. 1, after closing.

Subsequently, the mold is closed by sliding the right mold half 10 with the inner wall 18 ahead into the left mold half 2, as shown in FIG. 2. Thereby the blank 14 is compressed and the boundary regions of the blank adjacent to the two inner walls 16 and 18 are compacted and adhere thereto. At this point the spikes 8 are no longer required and, therefore, they are already retracted again.

Figure 3:
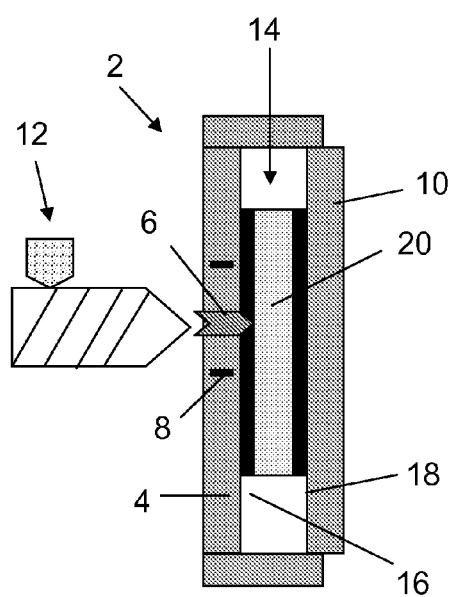
FIG. 3 the mold according to FIG. 2, after opening again.
Figure 4:
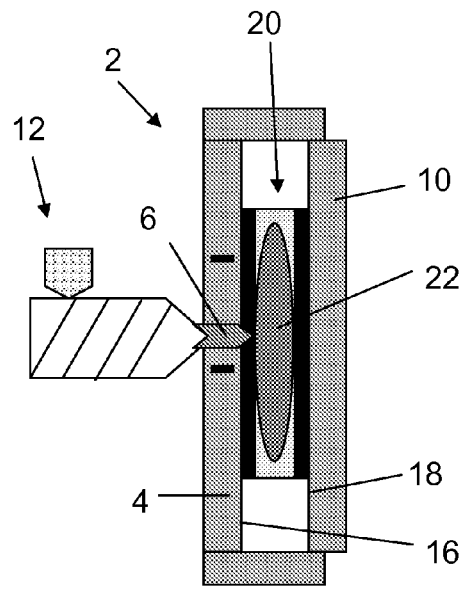
FIG. 4 the mold according to FIG. 3, during injection of the thermoplastic melt.

In the next process step the mold is opened again to the desired width according to FIG. 3, with the thermoplastic regions of the blank 14 adjacent to the inner walls 16 and 18 adhering to the inner walls. Accordingly, a gap region 20 is formed in the core region of the blank. Thereafter, according to FIG. 4, a predetermined amount of thermoplastic melt 22 is injected into the gap region 20.

Figure 5:
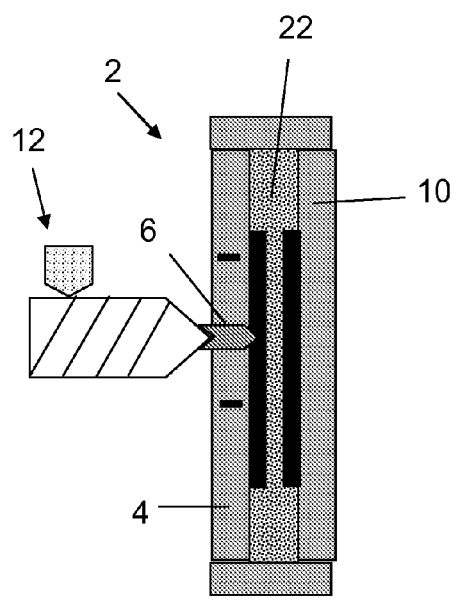
FIG. 5 the mold according to FIG. 4, after the further closing stroke is conducted.
Figure 6:
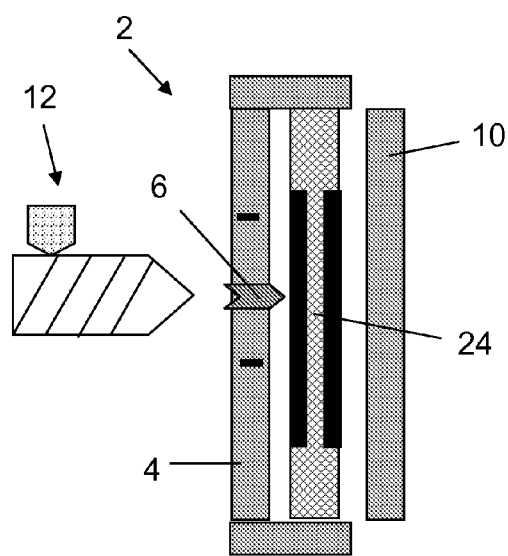
FIG. 6 the mold according to FIG. 5, during removal of the finished component.

In the example shown a further closing stroke is conducted, wherein—as shown in FIG. 5—the right mold half 10 is slid further into the left mold half 2. Thereby the polymer melt 22 is distributed within the entire inner volume of the mold.

Finally, the thermoplastic is cooled down, the mold is moved apart again, and the finished component 24 is subsequently extracted.

The invention claimed is:

1. An injection molding process for producing fiber reinforced components in a forming mold, comprising the following steps:
   A) heating a flat blank comprising two or more woven or non-crimp fiber fabrics connected at one or both sides thereof with a randomly oriented fiber layer, and impregnated with a first thermoplastic, to above the softening temperature of the thermoplastic,
   B) laying out the blank adjacent to one of two inner walls of the forming mold,
   C) closing the forming mold and compressing the blank such that boundary regions of the blank adjacent to inner walls of the forming mold are compacted and adhere to said inner walls,
   D) opening the mold following step C) to a desired width, and injecting a second thermoplastic melt into the forming mold,
   E) cooling the first and second thermoplastics, opening the mold and removing a fiber reinforced component thus formed from the forming mold.

2. The process of claim 1, wherein between steps D and E the mold is partially closed to distribute a melt of the first and second thermoplastics in the blank by this further closing.

3. The process of claim 2, wherein in steps A and D the blank is expanded perpendicularly to the blank plane by a factor of about 1.2 to 5 due to restoring forces of the randomly oriented fiber layers.

4. The process of claim 1, wherein in steps A and D the blank is expanded perpendicularly to the blank plane by a factor of about 1.2 to 5 due to restoring forces of the randomly oriented fiber layers.

5. The process of claim 1, wherein the flat blank contains two or four glass fiber woven or non-crimp fiber fabrics, which are needled at both sides thereof with a randomly oriented fiber layer or which are needled, at their side facing away from the mold inner wall, with a randomly oriented fiber layer.

6. The process of claim 5, wherein the flat blank is laminated on a side facing the mold inner wall with a thin glass fiber nonwoven.

7. The process of claim 1, wherein the blank is formed of single piece or strip.

8. The process of claim 1, wherein at one mold inner wall there are attached inwardly protruding needles, pins or spikes which penetrate the blank inserted in step B and thereby fix the blank to the inner wall, and that these needles, pins or spikes are refracted in step C.

9. The process of claim 1, wherein the thermoplastic injected in step D contains chopped fibers and/or mineral filler materials and/or a blowing agent.

10. The process of claim 1, wherein the blank and the injected melt both contain the same thermoplastic.

11. The process of claim 10, wherein the thermoplastic is polypropylene.

\* \* \* \* \*